(12) United States Patent
Zhu et al.

(10) Patent No.: US 11,032,529 B2
(45) Date of Patent: Jun. 8, 2021

(54) SELECTIVELY APPLYING COLOR TO AN IMAGE

(71) Applicant: MOTOROLA MOBILITY LLC, Chicago, IL (US)

(72) Inventors: Quan Zhu, Lincolnshire, IL (US); Daniel M. Bloom, Loveland, CO (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/775,136

(22) Filed: Jan. 28, 2020

(65) Prior Publication Data

US 2020/0169709 A1 May 28, 2020

Related U.S. Application Data

(63) Continuation of application No. 15/909,353, filed on Mar. 1, 2018, now Pat. No. 10,645,357.

(51) Int. Cl.
*H04N 9/76* (2006.01)
*G06T 7/90* (2017.01)
*H04N 5/272* (2006.01)

(52) U.S. Cl.
CPC ............ *H04N 9/76* (2013.01); *G06T 7/90* (2017.01); *H04N 5/272* (2013.01)

(58) Field of Classification Search
CPC ......... G06T 11/001; G06T 2207/10024; G06T 2207/20112; H04N 9/646; H04N 13/257;
(Continued)

(56) References Cited

U.S. PATENT DOCUMENTS 5,093,717 A   3/1992 Sandrew
9,251,613 B2* 2/2016 Hsun ..................... G06T 7/50
(Continued)

FOREIGN PATENT DOCUMENTS

EP     1318478 A3    6/2003

OTHER PUBLICATIONS

Final Cut Army, Final Cut Pro X—Selective Coloring Tutorial (Color Mask Effect), Apr. 28, 2015. https://www.youtube.com/watch?v=cxT3IPmwURs (Year 2015).
(Continued)

*Primary Examiner* — Chiawei Chen
(74) *Attorney, Agent, or Firm* — Isidore PLLC

(57) ABSTRACT

A method, a system, and a computer program product for generating a selective color image. The method includes capturing a color image data within a current scene. The method further includes retrieving image color values from the color image data. The method further includes receiving a selection of at least one location within the color image data. The method further includes generating a color mask, including at least one unmasked area identified within a depth map of the current scene, and applying the color mask to the color image data to generate a color masked image data. The method further includes combining the color masked image data with monochromatic image data of the current scene to create a selective color image that includes the monochromatic image data with the at least one portion, and then the method includes providing the selective color image to at least one output device.

20 Claims, 9 Drawing Sheets
(4 of 9 Drawing Sheet(s) Filed in Color)

Color Image Data 404

Depth Map 432

(58) Field of Classification Search
CPC ...... H04N 1/40012; H04N 1/465; H04N 9/76; H04N 9/70; H04N 9/74; G06F 16/785; G06K 9/4652
See application file for complete search history.

(56) References Cited

U.S. PATENT DOCUMENTS

| | | | |
|---|---|---|---|
| 9,342,751 B2* | 5/2016 | Heo | G06K 9/4652 |
| 9,384,556 B2* | 7/2016 | Mazurenko | G06T 7/11 |
| 9,384,585 B2* | 7/2016 | Kim | G06T 17/00 |
| 10,051,252 B1 | 8/2018 | Cohen et al. | |
| 10,424,060 B2* | 9/2019 | Satish | G06T 7/62 |
| 10,706,613 B2* | 7/2020 | Ye | G06T 5/50 |
| 2003/0128379 A1 | 7/2003 | Inoue | |
| 2004/0252886 A1 | 12/2004 | Pan et al. | |
| 2005/0057650 A1 | 3/2005 | Kogane et al. | |
| 2005/0093880 A1 | 5/2005 | Kim | |
| 2005/0231512 A1 | 10/2005 | Niles et al. | |
| 2005/0271267 A1 | 12/2005 | Cooper et al. | |
| 2006/0132850 A1 | 6/2006 | Banton et al. | |
| 2006/0245645 A1 | 11/2006 | Yatziv et al. | |
| 2008/0239343 A1 | 10/2008 | Ochs et al. | |
| 2009/0021518 A1* | 1/2009 | Harada | G06T 13/20 345/501 |
| 2009/0304269 A1 | 12/2009 | Willis | |
| 2010/0073502 A1 | 3/2010 | An et al. | |
| 2011/0211754 A1* | 9/2011 | Litvak | G06T 7/73 382/165 |
| 2012/0206475 A1 | 8/2012 | Bryant et al. | |
| 2012/0210229 A1 | 8/2012 | Bryant et al. | |
| 2012/0254369 A1 | 10/2012 | Gillard et al. | |
| 2012/0307112 A1 | 12/2012 | Kunishige et al. | |
| 2013/0121565 A1 | 5/2013 | Wang et al. | |
| 2013/0236091 A1 | 9/2013 | Ubillos et al. | |
| 2014/0282175 A1 | 9/2014 | Smith et al. | |
| 2015/0109323 A1 | 4/2015 | Johnson et al. | |
| 2015/0110351 A1 | 4/2015 | Cséfalvay et al. | |
| 2015/0156552 A1 | 6/2015 | Wayans et al. | |
| 2016/0094829 A1* | 3/2016 | Georgiev | H04N 19/46 348/43 |
| 2017/0061635 A1 | 3/2017 | Oberheu et al. | |
| 2017/0094258 A1 | 3/2017 | Cooper | |
| 2017/0178299 A1 | 6/2017 | Baek | |
| 2017/0337693 A1 | 11/2017 | Baruch | |
| 2017/0339409 A1 | 11/2017 | Socek et al. | |
| 2017/0372479 A1 | 12/2017 | Somanath et al. | |
| 2018/0041742 A1 | 2/2018 | Stetson | |
| 2018/0061068 A1* | 3/2018 | Jiao | G06T 7/13 |
| 2018/0075626 A1 | 3/2018 | Magielse | |
| 2018/0101939 A1 | 4/2018 | Priemer | |
| 2018/0276841 A1 | 9/2018 | Krishnaswamy et al. | |
| 2019/0014300 A1 | 1/2019 | Henry | |

OTHER PUBLICATIONS

U.K. Intellectual Property Office, Application No. GB1900386.2, Combined Search and Examination Report, dated Jun. 27, 2019.

* cited by examiner

Color Image Data 304

Selective Color Image 340

Color Image Data 404

Depth Map 432

Selective Color Image 440a
without Morphological Reconstruction

Selective Color Image 440n
with Morphological Reconstruction

Area 502a

Selective Color Image 540a

Selective Color Image with Morphological Reconstruction 540n

SELECTIVELY APPLYING COLOR TO AN IMAGE

PRIORITY APPLICATION

This application is a continuation of U.S. patent application Ser. No. 15/909,353, filed Mar. 1, 2018, the content of which is fully incorporated by reference.

BACKGROUND

1. Technical Field

The present disclosure generally relates to image capturing devices having cameras and in particular to a method for enhancing media captured by a camera.

2. Description of the Related Art

Many modern devices, such as cellular phones, are equipped with cameras that enable a user to capture images in a scene. Additionally, some solutions are available on modern devices that enable a user to remove color from portions of a captured image in order to create a modified image that has colored portions and monochrome portions. However, these solutions typically require a high-degree of user input in order to generate the modified image. Adverse conditions in the captured image may cause the modified image to not accurately reflect the user's desired image. For example, reflections in the scene may cause some portions of the scene to be improperly colored and/or rendered in monochrome within the modified image.

BRIEF DESCRIPTION OF THE DRAWINGS

The description of the illustrative embodiments is to be read in conjunction with the accompanying drawings. The patent or application file contains at least one drawing executed in color. Copies of this patent or patent application publication with color drawing(s) will be provided by the United States Patent and Trademark Office upon request and payment of the necessary fee. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
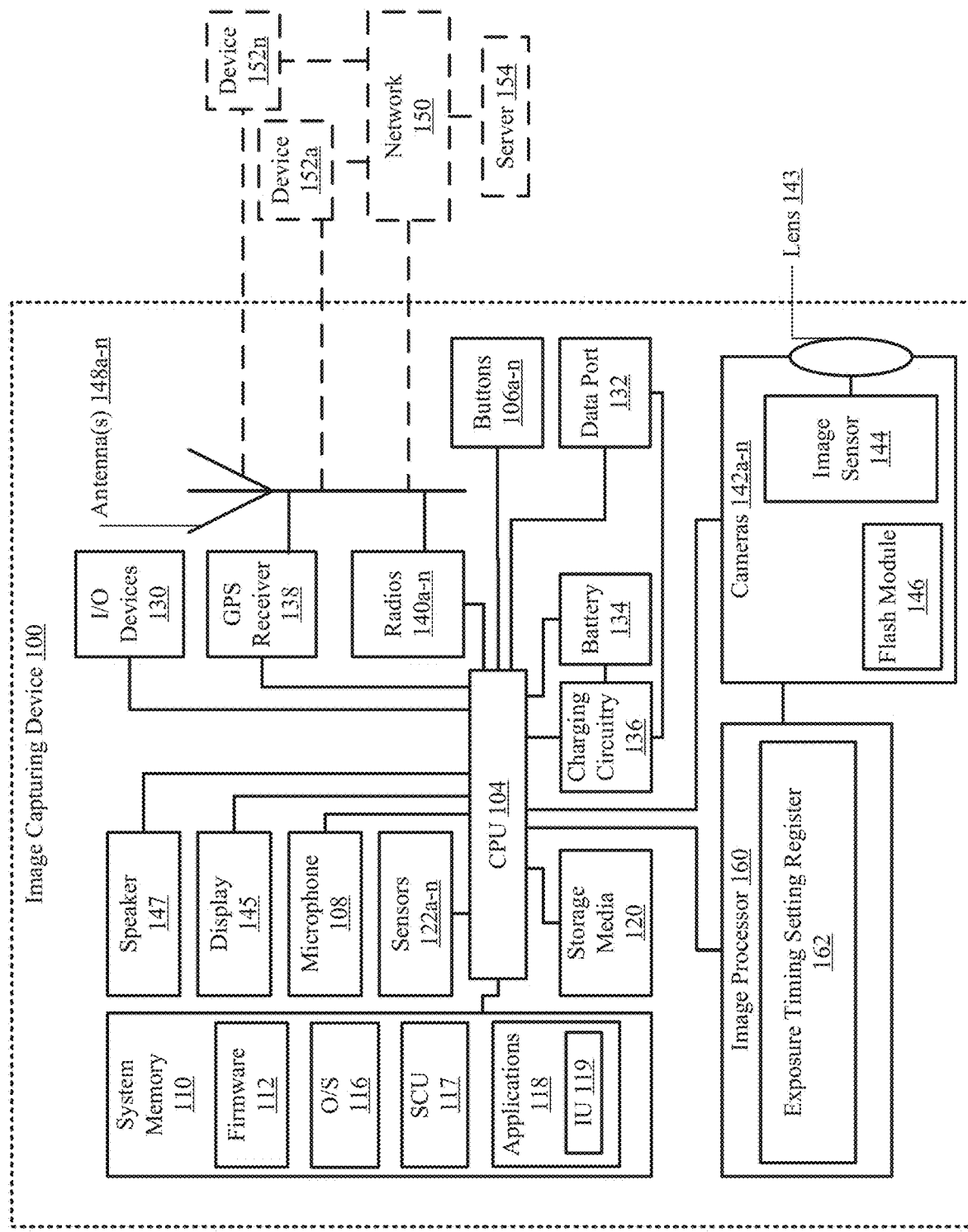
FIG. 1 illustrates an example image capturing device within which certain aspects of the disclosure can be practiced, in accordance with one or more embodiments.

The illustrative embodiments provide a method, a system, and a computer program product for generating a selective color image. The method includes capturing, by a first camera of an image capturing device, color image data within a current scene. The method further includes retrieving image color values from the color image data. The method further includes receiving, via an input device, a selection of at least one location within the color image data. The method further includes generating a color mask based on the at least one selected location and applying the color mask to the color image data to generate a color masked image data that includes at least one portion of the color image data and omits a remaining portion of the color image data. The method further includes combining the color masked image data with monochromatic image data of the current scene to create a selective color image that includes the monochromatic image data with the at least one portion, and then the method includes providing the selective color image to at least one output device.

The above contains simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the following figures and the remaining detailed written description. The above as well as additional objectives, features, and advantages of the present disclosure will become apparent in the following detailed description.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within the below described image capturing device 100 (FIG. 1) are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

Now turning to FIG. 1, there is illustrated an example image capturing device 100 within which one or more of the described features of the various embodiments of the disclosure can be implemented. In one embodiment, image capturing device 100 can be any electronic device that is equipped with at least one camera and at least one input device. For example, image capturing device 100 can include, but is not limited to, a desktop computer, a monitor, a notebook computer, a mobile/cellular phone, a mobile/cellular phone accessory, a digital camera, a video recorder, or a tablet computer. Image capturing device 100 includes central processing unit (CPU) 104. CPU 104 may contain a plurality of cores, each of which is capable of independent processing. In another embodiment, CPU 104 includes multiple CPUs. In another embodiment, CPU 104 may include a graphical processing unit (GPU), general purpose graphical processing unit (GPGPU), and/or digital signal processor (DSP). CPU 104 is coupled to storage media 120 and system memory 110, within which firmware 112, operating system (OS) 116, selective color utility (SCU) 117, and applications 118 can be stored for execution by CPU 104.

As shown, image capturing device 100 may include input devices and output devices (I/O devices 130) that enable a user to interface with image capturing device 100. In the illustrated embodiment, image capturing device 100 includes microphone 108, hardware buttons 106a-n, cameras 142a-n, and speaker 147. Image capturing device 100 may optionally include display 145. Microphone 108 may be used to receive spoken input/commands from a user. In other embodiments, microphone 108 includes multiple microphones. Hardware buttons 106a-n are selectable buttons which are used to receive manual/tactile input from a user to control specific operations of image capturing device 100 and/or of applications executing thereon. In one embodiment, hardware buttons 106a-n may also include, or may be connected to, one or more sensors (e.g. a fingerprint scanner) and/or may be pressure sensitive. Hardware buttons 106a-n may also be directly associated with one or more functions of a graphical user interface (not pictured) and/or functions of an OS, application, or hardware of image capturing device 100. In one embodiment, hardware buttons 106a-n may include a keyboard. Speaker 147 is used to output audio. In other embodiments, speaker 147 includes multiple speakers.

Cameras 142a-n are utilized to capture images and/or video within a current environment of image capturing device 100. Cameras 142a-n include lens 143 for focusing light in a current scene onto image sensor 144, which converts the focused light to a digital representation (e.g., an image and/or video). In one or more embodiments, cameras 142a-n include a shutter (not illustrated) that is selectively opened in order to focus light to image sensor 144. Cameras 142a-n may optionally include flash module 146 for illuminating a current scene with light during capture of images and/or video. In another embodiment, flash module 146 may be a standalone component of image capturing device 100. While one camera sensor is illustrated, image capturing device 100 may include multiple camera sensors, in other embodiments. For example, cameras 142*a-n* may include at least one color camera sensor (such as a red-green-blue (RGB) color sensor) and at least one separate monochrome camera sensor. Image capturing device 100 also includes image processor 160. Image processor 160 includes exposure timing setting register 162 which controls the timing of opening and closing of a shutter (not illustrated) of cameras 142*a-n* in order to expose image sensor 144 to a desired amount of light. The shutter timing may be user-controlled, based on factory settings, and/or dynamically adjusted based on conditions in a current environment of image capturing device 100. Cameras 142*a-n* and/or image processor 160 may also include an image compressor (not illustrated) that compresses, processes, and/or reformats images and/or video captured by cameras 142*a-n* into a format that is suitable for viewing on display 145 or into a format that is used by one or more applications (e.g., IU 119) of image capturing device 100.

CPU 104 is also coupled to sensors 122*a-n* and display 145. Sensors 122*a-n* can include, but are not limited to including, at least one of: motion sensors and/or accelerometers, proximity sensors, and/or additional cameras. Display 145 is capable of displaying text, media content, including images and video, and/or a graphical user interface (GUI) associated with or generated by firmware and/or one or more applications executing on image capturing device 100. In one embodiment, display 145 includes at least one internal display/monitor of image capturing device 100. In another embodiment, display 145 includes at least one external display, such as a remotely connected monitor, that is connected to image capturing device 100 via a wired and/or wireless connection. The GUI can be rendered by CPU 104 for viewing on display 145, in one embodiment, or can be rendered by a graphics processing unit (GPU) (not illustrated), in another embodiment. In one or more embodiments, display 145 is a touch screen that is also capable of receiving touch/tactile input from a user of image capturing device 100, such as when the user is interfacing with a displayed (or partially displayed) GUI. In at least one embodiment, image capturing device 100 can include a plurality of virtual buttons or affordances that operate in addition to, or in lieu of, hardware buttons 106*a-n*. For example, image capturing device 100 can be equipped with a touch screen interface and provide, via a GUI, a virtual keyboard or other virtual icons for user interfacing therewith.

Applications 118 include image utility (IU) 119 that renders captured media (e.g., images and/or video) on display 145. IU 119 further enables selection, via an input device (e.g., a touch screen display), of a particular location within the captured media that corresponds to a subject color for inclusion in a selective color image (e.g., selective color image 240 of FIG. 2), as described in greater detail below. According to one aspect, SCU 117 and IU 119 execute within image capturing device 100 to perform the various methods and functions described herein. In one or more embodiments, SCU 117 receives the selection of the particular location from IU 119 and generates a selective color image that includes at least one portion of color image data that corresponds to the particular location and omits a remaining portion of the color image data. For simplicity, SCU 117 is illustrated and described as a stand-alone or separate software/firmware/logic component, which provides the specific functions and methods described below. However, in at least one embodiment, SCU 117 may be a component of, may be combined with, or may be incorporated within firmware 112, or OS 116, and/or within one or more of applications 118. For example, SCU 117 may be an added utility provided as an extension of and/or within IU 119.

Image capturing device 100 also includes data port 132 (e.g., a universal serial bus (USB) port), battery 134, and charging circuitry 136. Data port 132 can operate as a charging port that receives power via an external charging device (not pictured) for charging battery 134 via charging circuitry 136. Data port 132 can operate as a charging port that provides power to an external device that is connected to data port 132 for charging a battery (not pictured) of the external device via charging circuitry 136. Battery 134 may include a single battery or multiple batteries for providing power to components of image capturing device 100. In at least one embodiment, battery 134 includes at least one battery that is removable and/or replaceable by an end user. In another embodiment, battery 134 includes at least one battery that is permanently secured within/to image capturing device 100. Data port 132 may also function as one of an input port, an output port, and a combination input/output port.

Image capturing device 100 may also include global positioning satellite (GPS) receiver 138 and one or more wireless radios 140*a-n*. GPS 138 may be coupled to at least one of antenna(s) 148*a-n* to enable image capturing device 100 to determine its current location and/or rate of travel. Wireless radios 140*a-n* may also be coupled to one or more of antenna(s) 148*a-n* to enable image capturing device 100 to wirelessly connect to, and transmit and receive voice and/or data communication to/from, one or more other devices, such as devices 152*a-n* and server 154. As a wireless device, image capturing device 100 can transmit data over a wireless network 150 (e.g., a Wi-Fi network, cellular network, Bluetooth® network (including Bluetooth® low energy (BLE) networks), a wireless ad hoc network (WANET), or personal area network (PAN)). In one embodiment, image capturing device 100 may be further equipped with infrared (IR) device (not pictured) for communicating with other devices using an IR connection. In another embodiment, wireless radios 140*a-n* may include a short-range wireless device, including, but not limited to, a near field communication (NFC) device. In still another embodiment, image capturing device 100 may communicate with one or more other device(s) using a wired or wireless USB connection.

Figure 2:
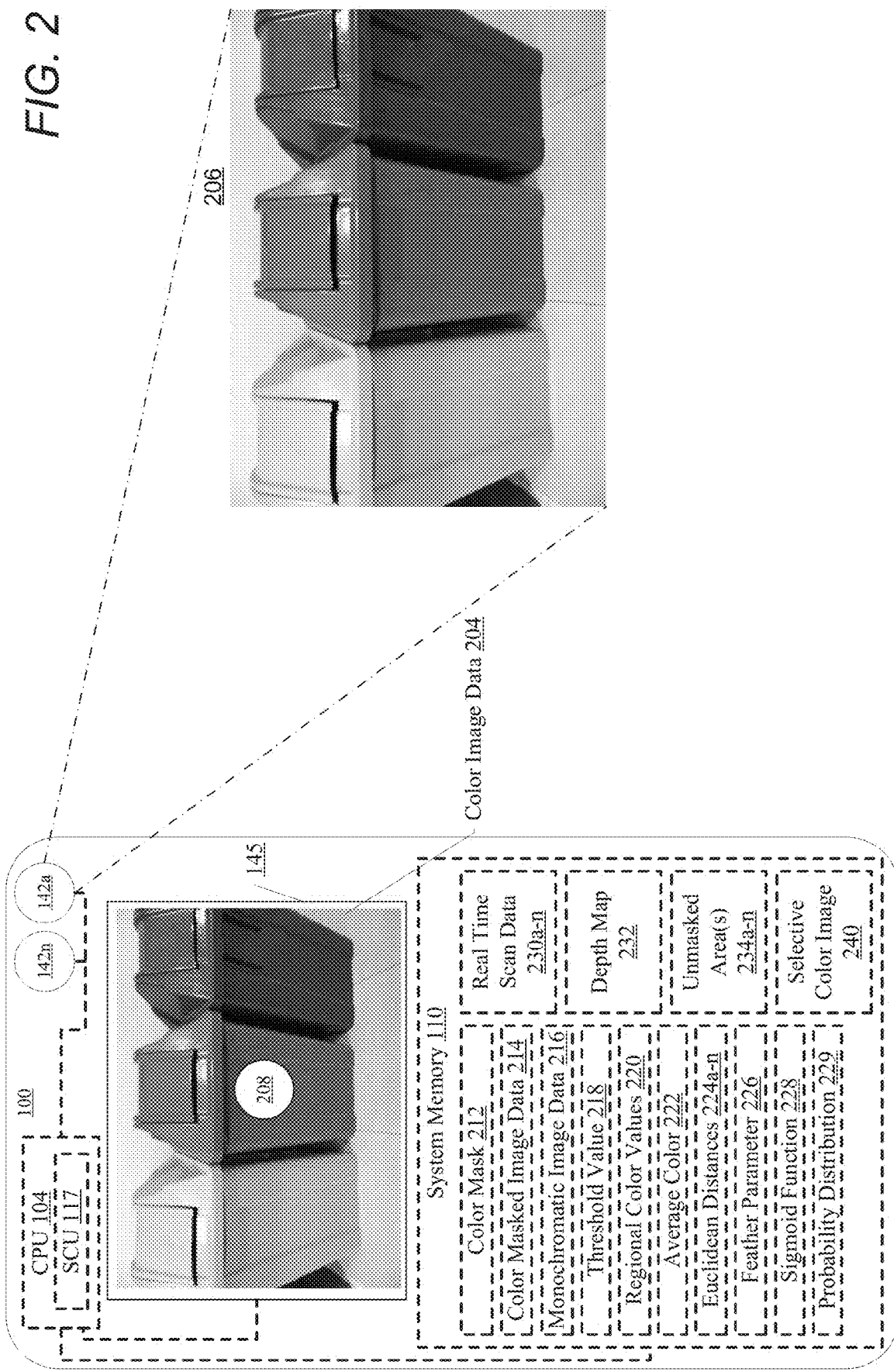
FIG. 2 illustrates an example image capturing device that captures color image data and generates a selective color image, in accordance with one or more embodiments.

FIG. 2 is a block diagram illustrating additional functional components within example image capturing device 100, in accordance with one or more embodiments of the present disclosure. As illustrated, image capturing device 100 includes CPU 104, which executes SCU 117. Image capturing device 100 also includes cameras 142*a-n*, display 145, and system memory 110. In one or more embodiments, cameras 142*a-n* are utilized by CPU 104 to capture color image data 204 in current scene 206. It should be noted that while two cameras are illustrated in FIG. 2, in other embodiments, image capturing device 100 may be configured with additional or fewer cameras, including a single camera. Display 145 is utilized to present color image data 204 for viewing by a user of image capturing device 100. Display 145 can also be utilized to display a generated selective color image 240, in accordance with one or more embodiments. In one or more embodiments, display 145 is a touch screen display that is capable of receiving touch input from a user, including, but not limited to a selection of at least one location 208 within color image data 204.

Image capturing device 100 captures color image data 204, by a first camera (e.g., camera 142a). In one or more embodiments, CPU 104 may also concurrently capture monochromatic image data 216 via a second camera (e.g., camera 142n). In response to capturing color image data 204, CPU 104 provides color image data 204 to at least one output device (e.g., display 145) for display. CPU 104 receives an input that specifies selection of location 208. Location 208 is a desired location/region of color image data 204 to which a selective coloring effect is applied. In one embodiment, location 208 is a single location. In another embodiment, location 208 may include multiple location selections. It should be noted that the selection of location 208 may be received via any suitable input device, including but not limited to, a touch-screen display, keyboard, or pointing device, such as a mouse or stylus. For example, while color image data 204 is being viewed on a touch-screen display (e.g., display 145), a user of image capturing device may touch a location on the touch-screen display and CPU 104 identifies a corresponding location within color image data 204 as location 208. In another embodiment, location 208 may be automatically selected by a software program of image capturing device 100 that is used to identify subjects in current scene 206.

In response to receiving the selection of location 208, CPU 104 generates color mask 212 for color image data 204 based on location 208. Color mask 212 identifies regions within color image data 204 that are to be included as color regions in selective color image 240. Portions of color image data 204 that are not included in color mask 212 are not included in selective color image 240, as described in greater detail below. In generating color mask 212, CPU 104 first analyzes color image data 204 to identify regional color values 220. Regional color values 220 are colors with a predefined color region that is centered at location 208. For example, regional color values 220 can include all color values within a 7×7 pixel area centered at location 208. In response to identifying regional color values 220, CPU 104 averages regional color values 220 to determine average color 222. CPU 104 then calculates Euclidean distance 224 for each pixel in color image data 204 using average color 222 as the origin. The Euclidean distance 224 for each pixel identifies a variance of the color of that pixel from average color 222. Pixels having a color that is similar to average color 222 will have a smaller Euclidean distance while pixels having a color that is more different from average color 222 will have a larger Euclidean distance. In response to calculating Euclidean distances 224a-n for each pixel in color image data 204, CPU 104 normalizes Euclidean distances 224a-n by applying feather parameter 226. CPU 104 can then apply Sigmoid function 228 to the normalized Euclidean distances 224a-n. Sigmoid function 228 generates probability distribution 229 which is a mapping of the normalized Euclidean distances of each pixel within a [0, 1] range. CPU 104 can then apply threshold value 218 to probability distribution 229 to generate/estimate color mask 212. CPU 104 then generates color mask 212 that encompasses all pixels and/or regions (including location 208) of color image data 204 having a probability of matching average color 222 that is greater than or equal to threshold value 218. In one embodiment, threshold value 218 is a predetermined manufacturer/factory preset value. In another embodiment, threshold value 218 may be established in settings of image capturing device 100 and may be adjusted by a user via at least one input device.

In response to generating color mask 212, CPU 104 applies color mask 212 to color image data 204 to generate color masked image data 214. Color masked image data 214 includes only those portions of color image data 204 that are included in color mask 212 and omits all other remaining portions of color image data 204. Thus, color masked image data 214 includes only those colored portions of color image data 204 that are desired for inclusion in selective color image 240. CPU 104 combines color masked image data 214 data with monochromatic image data 216, which comprises an entirely monochromatic reproduction of the current scene 206, to create selective color image 240. Thus, those portions of color image data 204 that are included in color masked image data 214 are included in selective color image 240 color, while the remainder of selective color image 240 includes the monochromatic portions of monochromatic image data 216. In one embodiment, when color image data 204 is captured by a first camera (e.g., camera 142a), CPU 104 concurrently captures monochromatic image data 216 via a second camera (e.g., camera 142n). In another embodiment, CPU 104 generates a monochromatic copy of color image data 204 and stores the monochromatic copy to system memory 110 as monochromatic image data 216.

In response to generating selective color image 240, CPU 104 provides selective color image 240 to at least one output device, such as display 145. In another embodiment, in response to generating selective color image 240, CPU 104 stores selective color image 240 to system memory 110, storage media 120, and/or a remote storage, such as a server-based storage or cloud-based storage.

It should be noted that color image data 204 may be captured in a raw format or in any original color space, such as the RGB color space, that is associated with camera 142a and/or image processor 160. In one or more embodiments, CPU 104 converts color image data 204 into the luminance, blue-difference and red-difference (YCbCr) color space prior to receiving the selection of location 208 and generating color mask 212. If necessary, CPU 104 may generate a duplicate copy of color image data 204 in a color space suitable for display on display 145. In another embodiment, CPU 104 may generate selective color image 240 in the original color space and/or any color space that is suitable for use by an output device of image capturing device 100.

In one or more embodiments, in response to generating color mask 212 but prior to applying color mask 212 to color image data 204, CPU 104 may perform at least one morphological reconstruction procedure to improve the quality of a generated selective color image 240 by adding unmasked areas 234a-n within color mask 212 to color mask 212 as masked areas. By performing morphological reconstruction, areas of color image data 204 that are inadvertently omitted from color mask 212 are added to color mask 212, thus improving the quality of the generated selective color image 240.

In a first embodiment, CPU 104 performs a morphological reconstruction procedure using a depth map. In this embodiment, CPU 104 utilizes at least a first camera (e.g., camera 142a) and a second camera (e.g., camera 142n) to simultaneously capture real-time scan data 230a-n in current scene 206. A first real-time scan data (e.g., real-time scan data 230a) is captured by the first camera and a second real-time scan data (e.g., real-time scan data 230n) is captured by the second camera. In one or more embodiments, real-time scan data 230a-n is captured concurrently with the capture of color image data 204. CPU 104 then performs a stereoscopic analysis using the real-time scan data 230a-n, known operational parameters of the first and second cameras, and a known distance between lenses of the first and second cameras to generate depth map 232. Depth map 232 identifies a depth of one or more objects in current scene 206. In response to generating depth map 232, CPU 104 analyzes color mask 212 using the depth measurements of objects in current scene 206 to identify any unmasked areas 234a-n that are adjacent to, and have a similar depth as, at least one portion of the color masked image data.

Figure 3A:
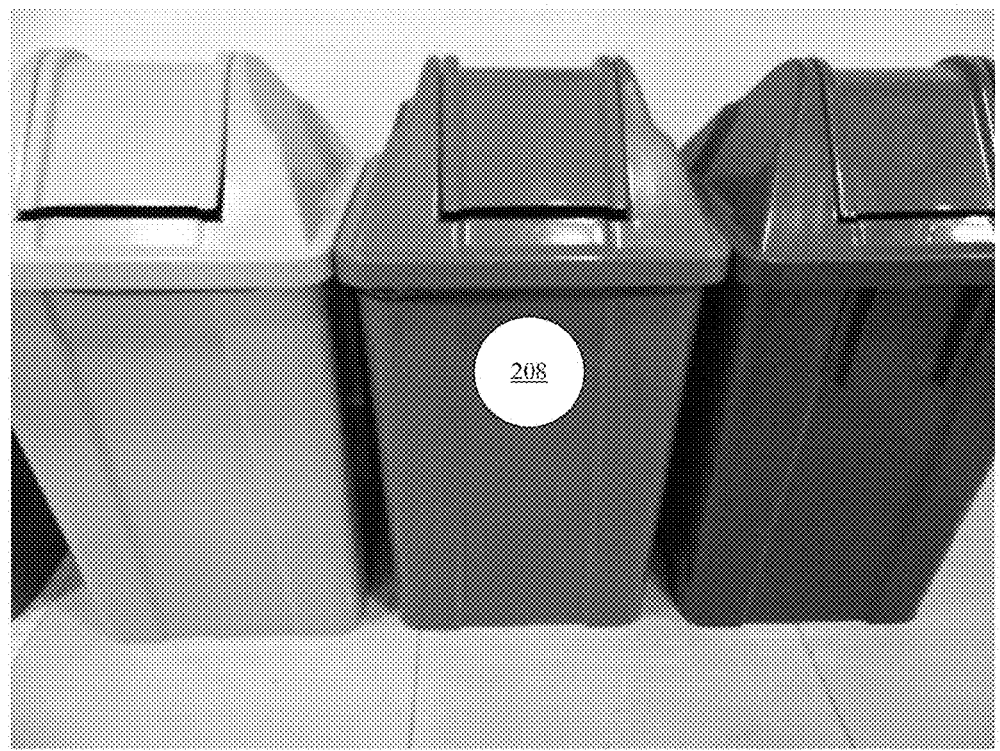
FIG. 3A is a photograph that depicts color image data captured by a camera of an image capturing device, in accordance with one or more embodiments.
Figure 3B:
FIG. 3B is a photograph that depicts a selective color image generated by an image capturing device, in accordance with one or more embodiments.

FIG. 3A is a photograph that depicts example color image data 304 that is captured by at least one camera of an image capturing device 100. CPU 104 receives an input that specifies selection of location 208 within color image data 304. FIG. 3B is a photograph that depicts an example selective color image 340 that is generated by image capturing device 100 based on at least one selected location within color image data 304. As depicted in FIG. 3B, selective color image 340 contains color on only the center red-object, which corresponds to location 208.

Figure 4A:
FIG. 4A is an illustration that depicts color image data captured by a camera of an image capturing device, in accordance with one or more embodiments.
Figure 4B:
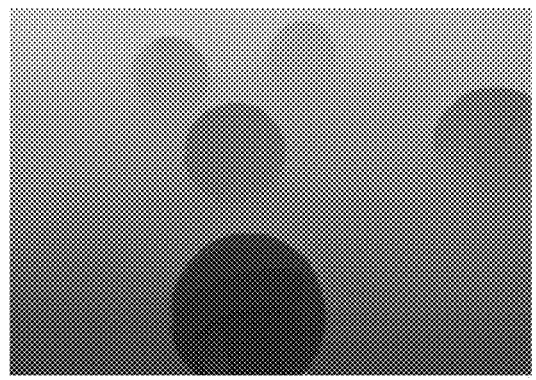
FIG. 4B is an illustration that depicts a real-time depth map generated from a plurality of cameras of an image capturing device, in accordance with one or more embodiments.
Figure 4C:
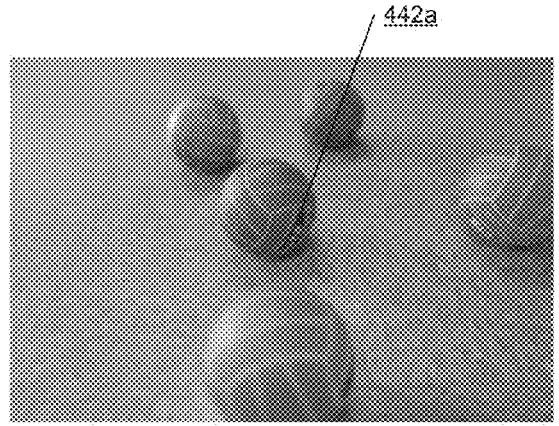
FIG. 4C is an illustration that depicts a selective color image without morphological reconstruction and which is generated by an image capturing device, in accordance with one or more embodiments.
Figure 4D:
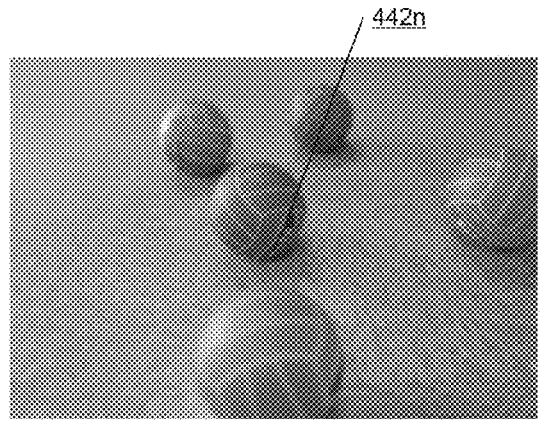
FIG. 4D is another illustration that depicts a selective color image with morphological reconstruction and which is generated by an image capturing device, in accordance with one or more embodiments.

Referring now to FIGS. 4A-D, there are depicted images that illustrate example color image data, a corresponding depth map, a selective color image without morphological reconstruction, and a selective color image with morphological reconstruction. FIG. 4A depicts color image data 204 captured by a camera (e.g., camera 142a) of image capturing device 100. FIG. 4B depicts depth map 432, which corresponds to color image data of 404 and which is generated from real-time scan data 230a-n, and captured by a plurality of cameras (e.g., cameras 142a-n) of image capturing device 100. FIG. 4C is a selective color image (e.g., selective color image 440a) without morphological reconstruction, in accordance with one or more embodiments. As shown in FIG. 4C, label portion 442a of the blue ball is not included in color in selective color image 440a. In one embodiment, the color distance between the color of the main surface of the ball and the color of label 442a is too great to be included within the color mask. Thus, label portion 442a of the ball is not present in the color mask despite being partially surrounded by color masked regions and having a similar depth as the adjacent color masked regions (as shown in depth map 432). FIG. 4D is an illustration that depicts a selective color image (e.g., selective color image 440n) with morphological reconstruction, in accordance with one or more embodiments. Using morphological reconstruction, CPU 104 identifies label portion 442n of the ball as being adjacent to, and having a similar depth as, at least one portion of a color masked image data generated by CPU 104. Thus, the label portion 442n is included and/or added to the depth mask and is included in color in selective color image 440n generated by CPU 104, as shown in FIG. 4D.

Referring again to FIG. 2, in a second embodiment, CPU 104 performs a morphological reconstruction procedure based on an analysis of captured color image data 204. In this embodiment, CPU 104 analyzes color masked image data 214 to determine whether there exists unmasked areas 234a-n (within color masked image data 214) that are entirely encircled by at least one masked region of the color masked image data 214. For example, CPU 104 may analyze color masked image data 214 and determine that there is an unmasked hole within color masked image data 214 that is completely surrounded by a plurality of masked regions. In response to identifying at least one unmasked area within the color masked image data 214 that is completely encircled by at least one masked region, CPU 104 adds the at least one unmasked area to color mask 212 and recalculates color masked image data 214 using the updated color mask 212.

Figure 5A:
FIG. 5A is an illustration that depicts a selective color image without morphological reconstruction and which is generated by an image capturing device, in accordance with one or more embodiments.
Figure 5B:
FIG. 5B is a next illustration that depicts a selective color image with morphological reconstruction and which is generated by an image capturing device, in accordance with one or more embodiments.

Referring now to FIGS. 5A-B, there is depicted images that illustrate selective color images generated with and without morphological reconstruction. FIG. 5A depicts a selective color image (e.g., selective color image 540a) without morphological reconstruction. As shown in FIG. 5A, there are several uncolored portions, including area 502a, within the colored flowers that are completely encircled by colored portions. These uncolored portions are not present in the color mask despite being surrounded by color masked regions. FIG. 5B depicts a selective color image (e.g., selective color image 540n) with morphological reconstruction. In this example, CPU 104 identifies, within color masked image data 214, the portions of the flower that are entirely encircled by at least one masked region of color masked image data 214. CPU 104 then updates color mask 212 to include unmasked areas (e.g., area 502a) and recalculates color masked image data 214 using the updated color mask 212. CPU 104 then generates selective color image 540n based on the recalculated color masked image data. As shown, the uncolored portions within the flowers of FIG. 5A are included in color in selective color image 540n of FIG. 5B.

Referring now to FIGS. 6-9, aspects of the method are described with reference to the components of FIGS. 1-2. Several of the processes of the method provided in FIGS. 6-9 can be implemented by a processor (e.g., CPU 104) executing software code (i.e., program instructions) of SCU 117 within an image capturing device (e.g., image capturing device 100). The method processes described in FIGS. 6-9 are generally described as being performed by components of image capturing device 100.

Figure 6:
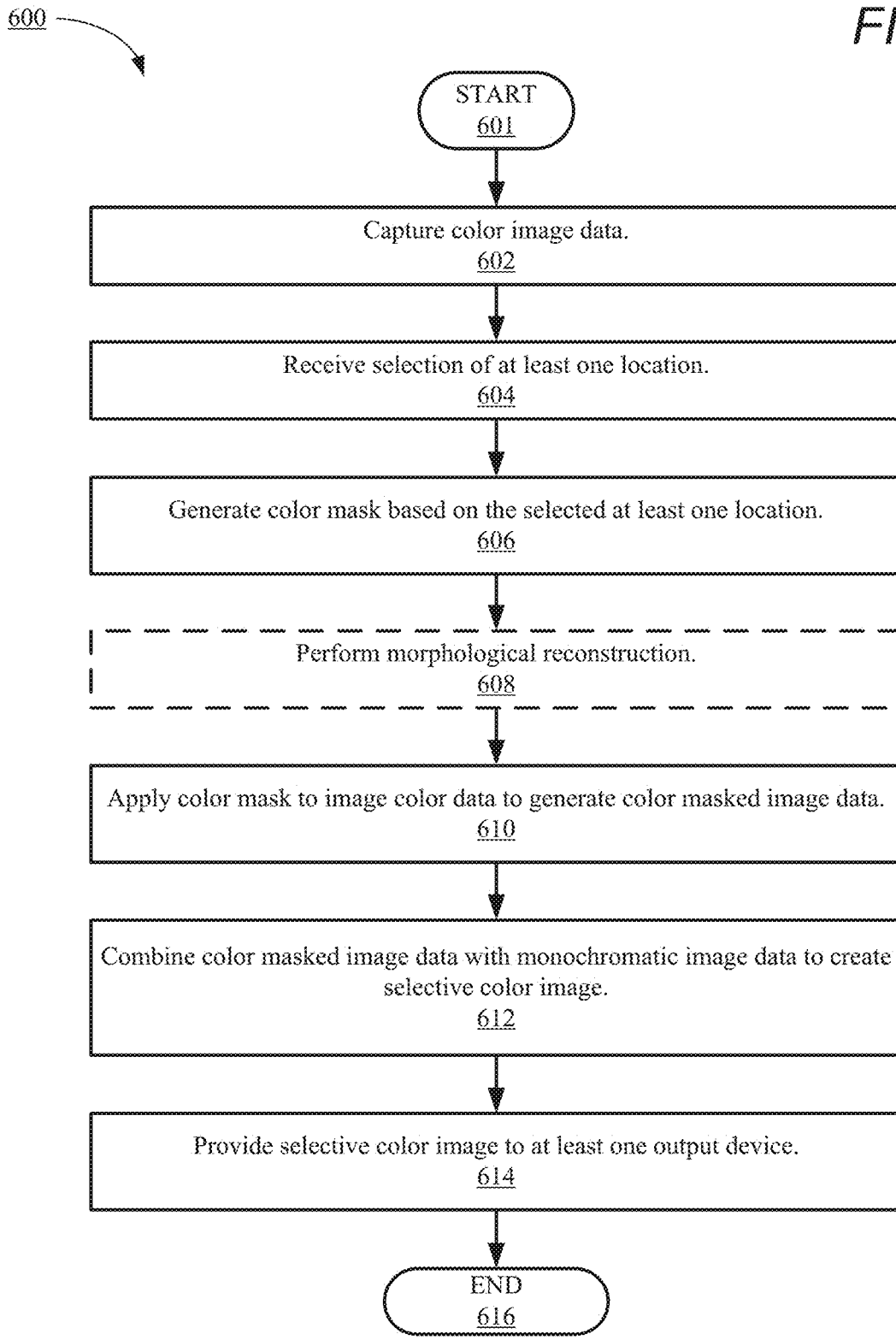
FIG. 6 is a flow chart illustrating a method for generating a selective color image, in accordance with one or more embodiments.

Referring now to FIG. 6, there is depicted a flow chart illustrating a method for generating a selective color image, in accordance with one or more embodiments of the present disclosure. Method 600 commences at initiator block 601 then proceeds to block 602. At block 602, image capturing device 100 captures color image data (e.g., color image data 204) via at least one camera (e.g., camera 142a). In one or more embodiments, in response to capturing the color image data, CPU 104 presents the color image data on a display (e.g., display 145) of image capturing device 100. At block 604, CPU 104 receives, via at least one input device, a selection of at least one location within the image data. At block 606, CPU 104 generates a color mask (e.g., color mask 212) for the color image data based on colors present within the at least one selected location. At optional block 608, CPU 104 performs a morphological reconstruction procedure to the color mask to fill in at least one unmasked area within the at least one selected location. In one embodiment, the morphological reconstruction procedure may be manually triggered by a user of image capturing device 100. In another embodiment, a configuration setting of image capturing device 100 may enable the morphological reconstruction procedure to be automatically performed during the generation of a selected color image. If the morphological reconstruction procedure is not to be performed, based on either user-request or settings of image capturing device 100, method 600 proceeds directly from block 606 to block 610.

At block 610, CPU 104 applies the color mask to the color image data to generate a color masked image data (e.g., color masked image data 214) that includes colored portions of the color image data that are associated with the at least one selected location and omits remaining portions of the color image data that are not associated with the at least one selected location and/or included in the color mask. At block 612, CPU 104 combines the color masked image data with a monochromatic image data (e.g., monochromatic image data 216) to create a selective color image (e.g., selective color image 240). The selective color image comprises the monochromatic portions of the monochromatic image data and the colored portions included within the color masked image data. In one embodiment, the monochromatic image data is contemporaneously captured by at least one second camera (e.g., camera 142*n*) of image capturing device 100. In another embodiment, CPU 104 generates a monochromatic copy of the color image data and stores the monochromatic copy to memory as the monochromatic image data. At block 614, CPU 104 provides the generated selective color image to at least one output device (e.g., display 145) and/or stores the selective color image to a memory (system memory 110) and/or storage (storage media 120). Method 600 then ends at block 616.

Figure 7:
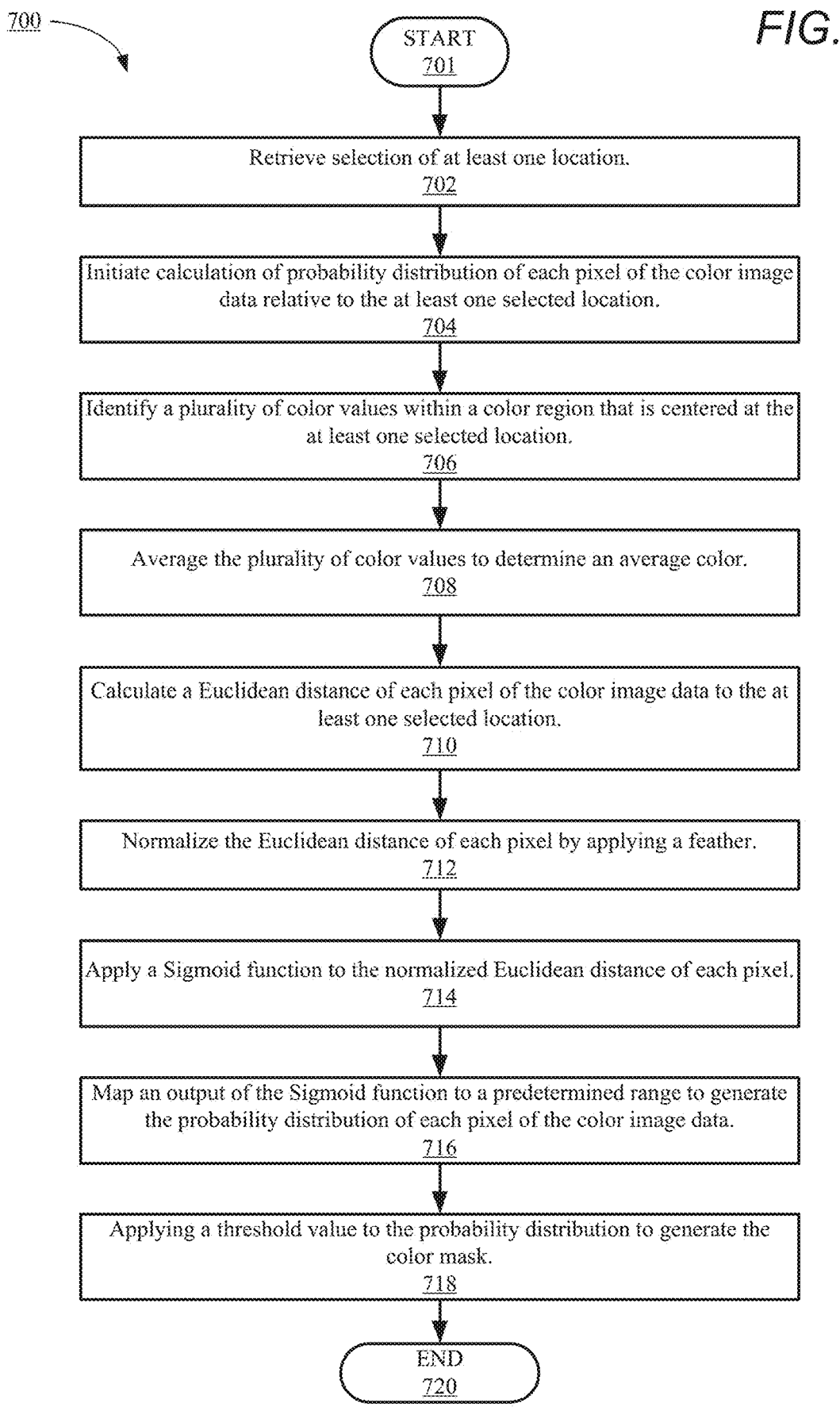
FIG. 7 is a flow chart illustrating a method for generating a color mask based on a captured color image data, in accordance with one or more embodiments.

Referring now to FIG. 7, there is depicted a flow chart illustrating a method for generating a color mask, in accordance with one or more embodiments of the present disclosure. In one or more embodiments, the features and/or functionality provided by method 700 may be performed at steps 604-606 of method 600, and are also described in FIG. 5, above. Method 700 commences at initiator block 701 then proceeds to block 702. At block 702, CPU 104 receives, via at least one input device, a selection of at least one location within the image data. At block 704, CPU 104 initiates a calculation of a probability distribution for each pixel of the color image data relative to the at least one selected location. At block 706, CPU 104 identifies a plurality of color values (e.g., regional color values 220) within a color region that is centered at the at least one selected location. In one embodiment, the color region is a predetermined size that is centered on the at least one selected location. At block 708, CPU 104 determines an average color value (e.g., average color 222) by averaging color values of the plurality of color values within the color region.

At block 710, CPU 104 calculates a Euclidean distance of each pixel of the color image data to the at least one selected location. At block 712, CPU 104 normalizes the Euclidean distance of each pixel by applying a feather parameter (e.g., feather parameter 226) to the Euclidean distance of each pixel. At block 714, CPU 104 applies a Sigmoid function to the normalized Euclidean distance of each pixel. At block 716, CPU 104 maps the output of the Sigmoid function to a [0, 1] range to generate a probability distribution (e.g., probability distribution 229) that quantifies a color distance between a color at the at least one selected location and the color at each pixel of the color image data. At block 718, CPU 104 applies a threshold value (e.g., threshold value 218) to the probability distribution to generate the color mask (e.g., color mask 212). The color mask includes at least one region of the color image data having a probability of matching an average color that is greater than the threshold value. It should be noted that the at least one region includes the at least one selected location within the color image data. Method 700 then ends at block 720.

Figure 8:
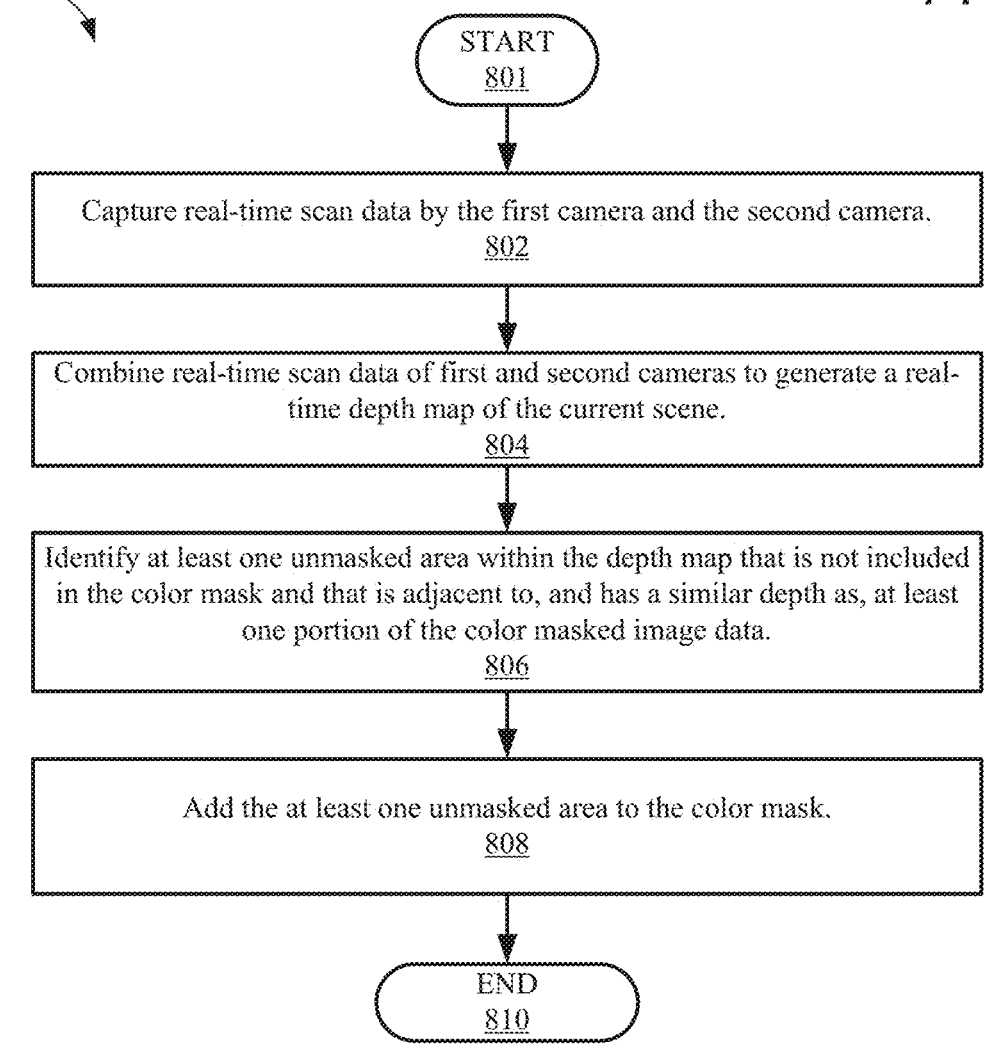
FIG. 8 is a flow chart illustrating a method for using real-time scan data to add unmasked areas to a color mask, in accordance with one or more embodiments.

Referring now to FIG. 8, there is depicted a flow chart illustrating a method for using real-time scan data to add unmasked areas to a color mask, in accordance with one or more embodiments of the present disclosure. In one or more embodiments, the features and/or functionality provided by method 800 may be performed at optional step 608 of method 600, and is also described in FIG. 5, above. Method 800 commences at initiator block 801 then proceeds to block 802. At block 802, image capturing device 100 captures real-time scan data in a current scene by a first camera (e.g., camera 142*a*) and a second camera (e.g., camera 142*n*). At block 804, CPU 104 combines the real-time scan data captured by the first and second cameras to create a depth map (e.g., depth map 232) that identifies a depth to objects in the current scene. At block 806, CPU 104 analyzes the depth map to identify at least one unmasked area (e.g., unmasked areas 234*a-n*) within the depth map that is not included in the color mask (e.g., color mask 212) and that is adjacent to, and has a similar depth as, at least one portion of the color masked image data. At block 808, CPU 104 adds the identified unmasked areas to the color mask. Method 800 then terminates at block 810.

Figure 9:
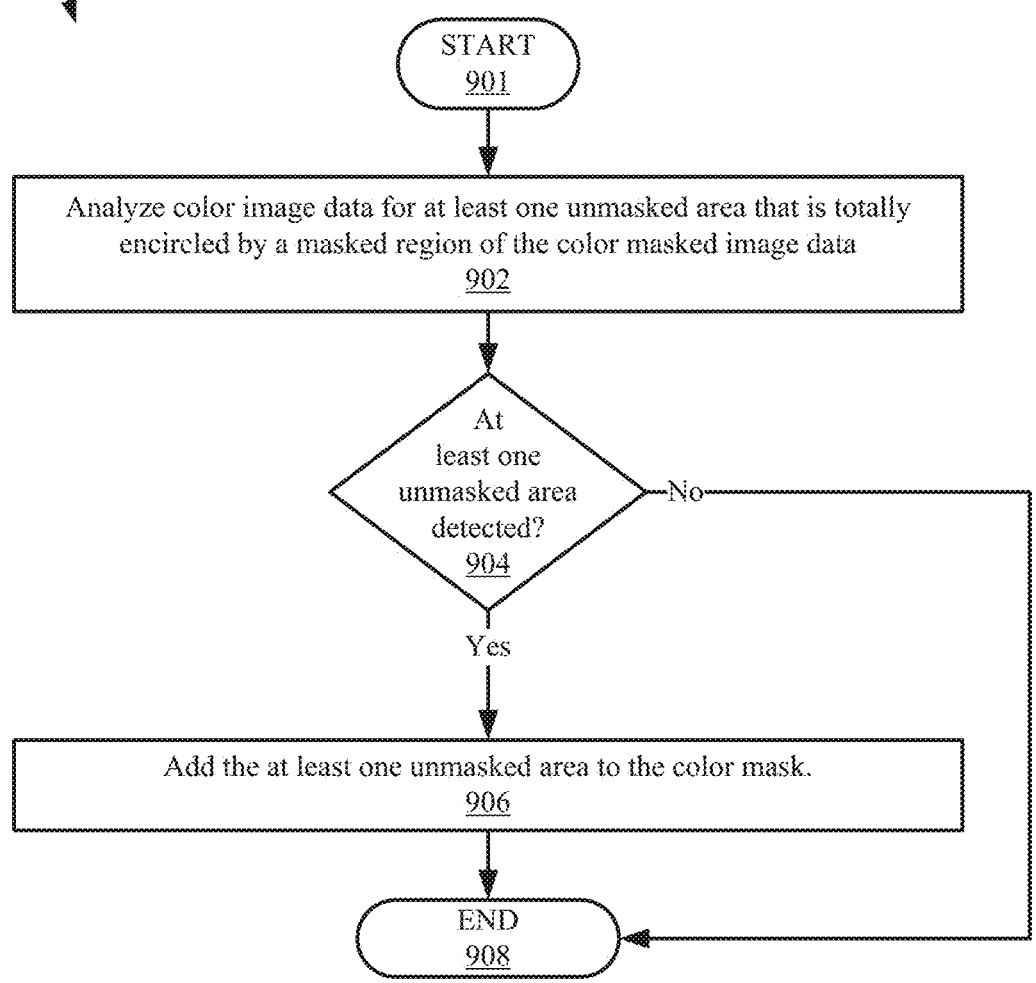
FIG. 9 is a flow chart illustrating a method for adding unmasked areas to a color mask based on an analysis of color image data, in accordance with one or more embodiments.

Referring now to FIG. 9, there is depicted a flow chart illustrating a method for adding unmasked areas to a color mask based on an analysis of color image data, in accordance with one or more embodiments of the present disclosure. In one or more embodiments, the features and/or functionality provided by method 900 may be performed at optional step 608 of method 600 (as described in FIG. 5, above). Method 900 commences at initiator block 901 then proceeds to block 902. At block 902, CPU 104 analyzes color image data (e.g., color image data 204) to identify at least one unmasked area (e.g., unmasked areas 234*a-n*) that corresponds to an area of the color masked image data (e.g., color masked image data 214) and that is totally encircled by a masked region. At block 904, CPU 104 determines whether at least one unmasked area has been identified. In response to determining no unmasked areas have been identified, method 900 terminates at block 908. At block 906, In response to determining at least one unmasked area has been identified, CPU 104 adds the identified at least one unmasked area to the color mask (e.g., color mask 212). Method 900 then terminates at block 908.

In the above-described flow charts of FIG. 6-9, one or more of the method processes may be embodied in a computer readable device containing computer readable code such that a series of steps are performed when the computer readable code is executed on a computing device. In some implementations, certain steps of the methods are combined, performed simultaneously or in a different order, or perhaps omitted, without deviating from the scope of the disclosure. Thus, while the method steps are described and illustrated in a particular sequence, use of a specific sequence of steps is not meant to imply any limitations on the disclosure. Changes may be made with regards to the sequence of steps without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general-purpose computer, special-purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method comprising:
   capturing, by a first camera of an image capturing device, a color image data within a current scene;
   receiving, via an input device, a selection of at least one location within the color image data;
   generating a color mask based on the at least one selected location;
   identifying, within a depth map of the current scene, at least one unmasked area that is not included in the color mask and which has a depth on the depth map of at least one portion of the color image data;
   adding the at least one unmasked area to the color mask;
   applying the color mask to the color image data to generate a color masked image data that includes the at least one portion of the color image data and omits a remaining portion of the color image data;
   combining the color masked image data with monochromatic image data of the current scene to create a selective color image that includes the color image data in the at least one portion, while a remainder of the selective color image includes monochromatic portions of monochromatic image data; and
   providing the selective color image to at least one output device.

2. The method of claim 1, further comprising:
   contemporaneously capturing, within the current scene, the monochromatic image data by a second camera of the image capturing device.

3. The method of claim 1, further comprising:
   generating a monochromatic copy of the color image data and storing the monochromatic copy as the monochromatic image data.

4. The method of claim 1, wherein generating the color mask further comprises:
   calculating a probability distribution of each pixel of the color image data relative to the at least one selected location; and
   applying a threshold value to the probability distribution to generate the color mask, the color mask encompassing at least one region of the color image data having a probability of matching an average color that is greater than the threshold value, the at least one region including the at least one selected location.

5. The method of claim 4, wherein calculating the probability distribution further comprises:
   identifying a plurality of color values within a color region that is centered at the at least one selected location;
   averaging the plurality of color values to determine an average color;
   calculating an Euclidean distance of each pixel of the color image data to the average color;
   normalizing the Euclidean distance of each pixel by applying a feather parameter;
   applying a Sigmoid function to the normalized distance of each pixel; and
   mapping an output of the Sigmoid function to a predetermined range to generate the probability distribution of each pixel of the color image data.

6. The method of claim 1, where the identifying comprises:
   capturing real-time scan data by the first camera and a second camera of the image capturing device;

combining the real-time scan data captured by the first camera and the second camera to generate the depth map of the current scene; and identifying, within the depth map, the at least one unmasked area that is adjacent to the at least one portion and which has the depth of the at least one portion.

7. The method of claim 1, further comprising:
detecting, within the color image data, at least one unmasked area that is totally encircled by a masked region from among the at least one portion; and
adding the at least one unmasked area to the color mask.

8. The method of claim 1, wherein the selected location is a desired location or region of color image data to which a selective coloring effect is applied, wherein the selection of the location comprises one of selection of a single location or selection of multiple locations.

9. An image capturing device comprising:
a memory;
at least one camera that captures color image data within a current scene;
at least one input device that receives a selection of at least one location within the color image data;
at least one processor that:
generates a color mask based on the at least one selected location;
identifies, within a depth map of the current scene, at least one unmasked area that is not included in the color mask and which has a depth on the depth map of at least one portion of the color image data;
adding the at least one unmasked area to the color mask
adds the at least one unmasked area to the color mask;
applies the color mask to the color image data to generate a color masked image data that includes the at least one portion of the color image data and omits a remaining portion of the color image data;
combines the color masked image data with monochromatic image data of the current scene to create a selective color image that includes the color image data in the at least one portion, while a remainder of the selective color image includes monochromatic portions of monochromatic image data; and
provides the selective color image to at least one output device.

10. The image capturing device of claim 9, further comprising at least one second camera that contemporaneously captures the monochromatic image data within the current scene.

11. The image capturing device of claim 9, wherein the at least one processor:
generates a monochromatic copy of the color image data; and
stores the monochromatic copy to the memory as the monochromatic image data.

12. The image capturing device of claim 9, wherein in generating the color mask, the at least one processor:
calculates a probability distribution of each pixel of the color image data relative to the at least one selected location; and
applies a threshold value to the probability distribution to generate the color mask, the color mask encompassing at least one region of the color image data having a probability of matching an average color that is greater than the threshold value, the at least one region including the at least one selected location.

13. The image capturing device of claim 12, wherein in calculating the probability distribution, the at least one processor:
identifies a plurality of color values within a color region that is centered at the at least one selected location;
averages the plurality of color values to determine an average color;
calculates an Euclidean distance of each pixel of the color image data to the average color;
normalizes the Euclidean distance of each pixel by applying a feather parameter;
applies a Sigmoid function to the normalized distance of each pixel; and
maps an output of the Sigmoid function to a predetermined range to generate the probability distribution of each pixel of the color image data.

14. The image capturing device of claim 9, wherein:
the at least one camera captures real-time scan data within the current scene;
the at least one second camera contemporaneously captures real-time scan data within the current scene; and
the at least one processor:
combines the real-time scan data captured by the at least one camera and the at least one second camera to generate the depth map of the current scene; and
identifies, within the depth map, the at least one unmasked area that is adjacent to the at least one portion and which has the depth of the at least one portion.

15. The image capturing device of claim 9, wherein the at least one processor:
detects, within the color image data, at least one unmasked area that is totally encircled by a masked region from among the at least one portion; and
adds the at least one unmasked area to the color mask.

16. A computer program product comprising:
a non-transitory computer readable storage device; and
program code on the computer readable storage device that, when executed by a processor associated with an image capturing device, enables the image capturing device to provide the functionality of:
capturing, by a first camera of an image capturing device, a color image data within a current scene;
receiving, via an input device, a selection of at least one location within the color image data;
generating a color mask based on the at least one selected location;
identifying, within a depth map of the current scene, at least one unmasked area that is not included in the color mask which has a similar depth as a depth of at least portion of the color image data;
identifying, within a depth map of the current scene, at least one unmasked area that is not included in the color mask and which has a depth on the depth map of at least one portion of the color image data;
adding the at least one unmasked area to the color mask
adding the at least one unmasked area to the color mask;
applying the color mask to the color image data to generate a color masked image data that includes the at least one portion of the color image data and omits a remaining portion of the color image data;
combining the color masked image data with monochromatic image data of the current scene to create a selective color image that includes the color image data in the at least one portion, while a remainder of the selective color image includes monochromatic portions of monochromatic image data; and providing the selective color image to at least one output device.

17. The computer program product of claim 16, the program code for generating the color mask further comprising code for:

calculating a probability distribution of each pixel of the color image data relative to the at least one selected location; and applying a threshold value to the probability distribution to generate the color mask, the color mask encompassing at least one region of the color image data having a probability of matching an average color that is greater than the threshold value, the at least one region including the at least one selected location.

18. The computer program product of claim 17, the program code for calculating the probability distribution further comprising code for:

identifying a plurality of color values within a color region that is centered at the at least one selected location;

averaging the plurality of color values to determine an average color;

calculating an Euclidean distance of each pixel of the color image data to average color;

normalizing the Euclidean distance of each pixel by applying a feather parameter;

applying a Sigmoid function to the normalized distance of each pixel; and mapping an output of the Sigmoid function to a predetermined range to generate the probability distribution of each pixel of the color image data.

19. The computer program product of claim 16, the program code further comprising code for:

capturing real-time scan data by the first camera and a second camera of the image capturing device;

combining the real-time scan data captured by the first camera and the second camera to generate a depth map of the current scene; and identifying, within the depth map, the at least one unmasked area that is adjacent to the at least one portion and which has the depth of the at least one portion.

20. The computer program product of claim 16, the program code further comprising code for:

detecting, within the color image data, at least one unmasked area that is totally encircled by a masked region from among the at least one portion; and adding the at least one unmasked area to the color mask.

\* \* \* \* \*